US008671131B2

(12) United States Patent
Collet et al.

(10) Patent No.: US 8,671,131 B2
(45) Date of Patent: Mar. 11, 2014

(54) METHOD AND SYSTEM ENABLING THE CANCELLATION OF A PREVIOUSLY-SENT E-MAIL MESSAGE

(75) Inventors: Jean-Luc Collet, St. Laurent du Var (FR); Francois-Xavier Drouet, Nice (FR); Gerard Marmigere, Drap (FR); Joaquin Picon, Paul Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 1887 days.

(21) Appl. No.: 10/822,432

(22) Filed: Apr. 12, 2004

(65) Prior Publication Data

US 2004/0230642 A1 Nov. 18, 2004

(30) Foreign Application Priority Data

Apr. 29, 2003 (EP) ..................................... 03368043

(51) Int. Cl.
*G06F 15/16* (2006.01)
(52) U.S. Cl.
USPC .......................................... 709/200; 709/206
(58) Field of Classification Search
USPC .................. 709/200, 202, 206, 207
See application file for complete search history.

(56) References Cited

U.S. PATENT DOCUMENTS

| 5,870,548 A * | 2/1999 | Nielsen .......................... 709/206 |
| 6,310,694 B1 * | 10/2001 | Okimoto et al. ............. 358/1.15 |
| 6,721,784 B1 * | 4/2004 | Leonard et al. ............... 709/206 |
| 7,793,334 B2 * | 9/2010 | Lewis ............................... 726/2 |
| 2003/0028580 A1 * | 2/2003 | Kucherawy .................... 709/101 |
| 2004/0078439 A1 * | 4/2004 | Staack .......................... 709/206 |

* cited by examiner

*Primary Examiner* — John Follansbee
*Assistant Examiner* — Glenford Madamba
(74) *Attorney, Agent, or Firm* — Andrea Bauer; Hoffman Warnick LLC

(57) ABSTRACT

System enabling the cancellation of previously-sent e-mail comprising a data transmission network, wherein a plurality of users are connected to the network, each user being able as a sender to forward an e-mail over the network to at least another user as a recipient connected to the network, and wherein a message transfer agent MTA is associated with each user for sending the e-mail when the user acts as a sender and delivering the e-mail when the user acts as a recipient. Each MTA includes a cancel mailbox for transmitting a cancellation message to the recipient(s) when the user associated with the MTA is a sender wanting to cancel a previously-sent e-mail or for managing the cancellation of e-mails in the mailbox of the user associated with the MTA upon receiving the cancellation message from the sender when this user is a recipient.

16 Claims, 11 Drawing Sheets

METHOD AND SYSTEM ENABLING THE CANCELLATION OF A PREVIOUSLY-SENT E-MAIL MESSAGE

FIELD OF THE INVENTION

The present invention relates generally to communications by electronic mail (e-mail) through a data transmission network, and relates in particular to a method and system for canceling an e-mail message which has previously been sent to one or more recipients.

BACKGROUND OF THE INVENTION

Electronic mail (e-mail) provides a quick and convenient way for Internet users throughout the world to communicate between one another. Such a communication is initiated by a message sender composing a message, which optionally includes joined files, and addressing the message to one or more recipients.

Once a message has been composed and a "send" key has been activated, the message will be delivered to each of the addressed recipients automatically, provided that valid e-mail destination addresses have been used in the message. A message may pass through a number of separate server computers, generally SMTP servers (also called Message Transfer Agents (MTA)), before reaching its final destination. The action of each MTA is defined as a "store and forward" which means that each message is temporarily stored and then forwarded when the MTA has an appropriate channel available.

One characteristic of the Internet network is that once a message is submitted to the Internet, the message becomes an independent entity (no longer under the control of the sender). This means that, once the message has been transmitted over the Internet, it cannot be directly altered, canceled or retracting by the originating sender.

However, in some situations, an e-mail user can use an unsend operation. Assuming that the sender sent the message to a wrong recipient or forgot to include an important item in the message, the sender may wish to stop transmission of the message before the message reaches the recipient. In certain software packages, this operation is possible by pressing an "undo" key. However, there is a difficulty with the "undo" function for e-mail insofar as the operation usually involves a number of independent servers not under the control of the user software.

Some e-mail systems provide a central repository for e-mail. Using this type of e-mail system, the message sender composes the message and sends the message to the recipient. The e-mail system saves the message in the e-mail repository until the recipient retrieves the message. In such a system, the sender can stop delivery of the message if the recipient has not yet retrieved the message because the message remains within the scope of control of the originating e-mail system.

Another messaging scheme is the Usenet Network News facility (netnews) that is well known to the art. Netnews has a "cancel" feature that allows the author of a message to send a follow-up cancel message that causes the recipient computers to remove the original message from their news directory. This netnews feature relies on the standardized nature of netnews—all recipient computers are programmed to process cancel messages.

However, in the above systems, once an e-mail has passed beyond the control of the originating sender, the e-mail cannot be canceled. This problem has been solved in systems wherein a cancel message is sent by the sender to all the recipients of the first message. Such a cancel message is either a duplicate message of the original message including a canceling tag or an action message including some information contained in the original message. Once this second message is received by the recipient, both original message and cancel message are deleted if the original message has not been read by the recipient.

Unfortunately, the above mechanism relates only to means for canceling messages which have not yet been read without looking for whether some recipients have already read the message. This means that some recipients, among the recipients who have received the e-mail, will be able to make some decisions whereas other recipients will not be able to make decisions since they will not have received the e-mail, which results in a possible discrepancy. Such a solution is not acceptable in some cases wherein an action must be achieved by all the recipients or by none of them. Therefore, there is a need to have a mechanism enabling a user to send an e-mail to each designated recipient or, conversely, to cancel this e-mail for all recipients.

SUMMARY OF THE INVENTION

Accordingly, the invention provides a method and system enabling canceling of an e-mail forwarded by a sender to one or more recipients only when none of these recipients has read the e-mail.

The invention relates therefore to a system enabling the cancellation of a previously-sent e-mail comprising a data transmission network (e.g., the Internet network) wherein a plurality of users are connected to the network, each user being able as a sender to send an e-mail over the network to at least another user as a recipient connected to the network, and wherein a message transfer agent (MTA) is associated with each user for sending the e-mail when the user acts as a sender and delivering the e-mail when the user acts as a recipient. Each MTA includes a cancel mailbox for transmitting a cancellation message to the recipient(s) when the user associated with the MTA is a sender wanting to cancel a previously-sent e-mail or for managing the cancellation of e-mails in the mailbox of the user associated with the MTA upon receiving a cancellation message from the sender when this user is a recipient.

According to another aspect of the present invention, the method of canceling a previously-sent e-mail comprises:
  sending from the sender a message for deleting the e-mail to a cancel mailbox included in the MTA,
  sending from the cancel mailbox included in the sender MTA a message to a cancel mailbox included in each MTA respectively associated with each recipient being addressed in the e-mail in order to inform them that the e-mail has to be deleted if it has not yet been read,
  sending from the cancel mailboxes of the MTAs respectively associated with the recipients a message requesting that the e-mail has to be masked only if it has not yet been read, and
  deleting or not deleting the masked e-mail according to whether none of the recipients has read the e-mail or not.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
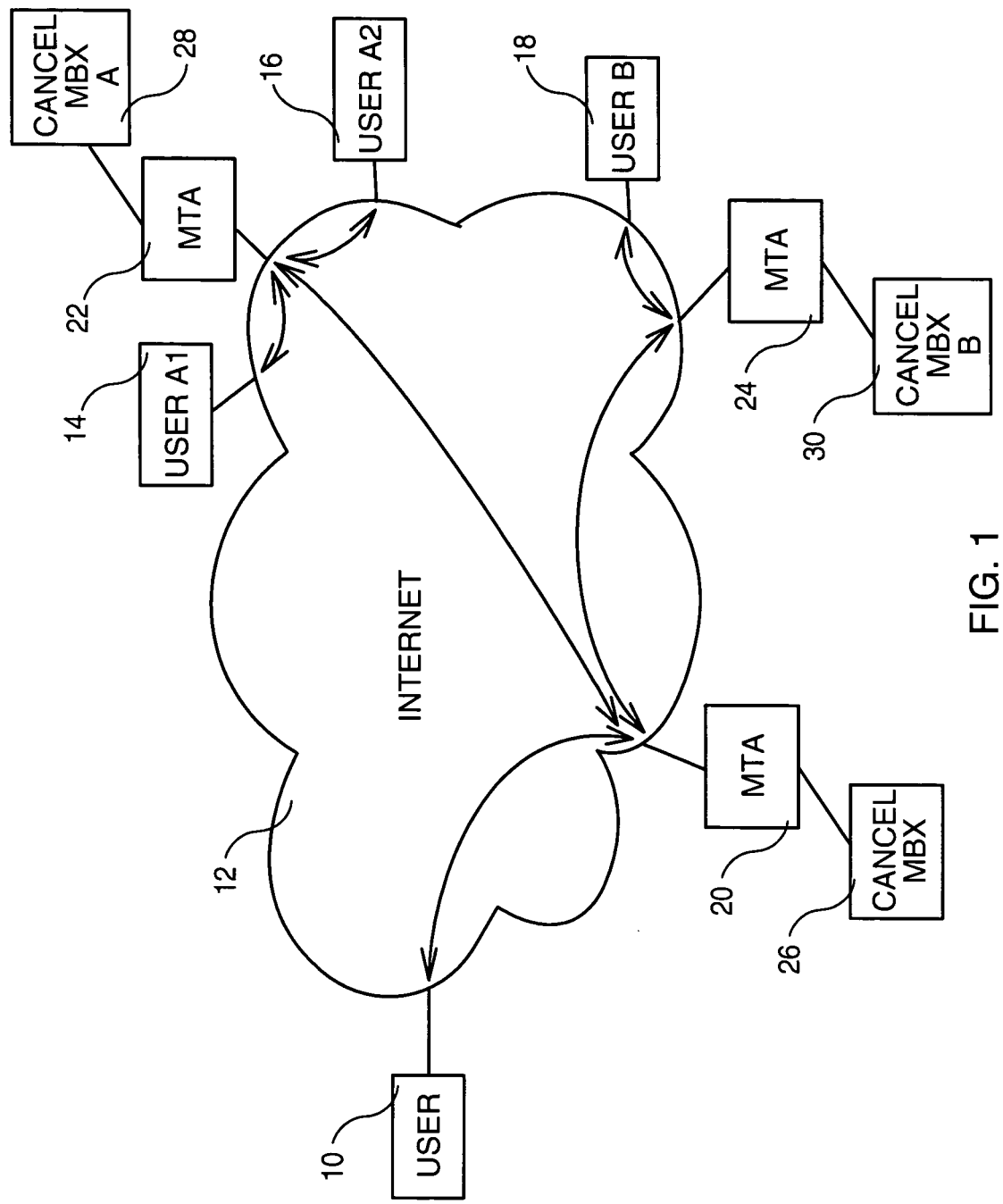
FIG. 1 is a first embodiment of a data transmission system enabling the cancellation of a previously-sent e-mail message according to the invention.

In reference to FIG. 1, a user 10 called the sender wants to send an e-mail or several e-mails through the Internet network 12 to several other users called the recipients such as users 14, 16 and 18. It is of no importance if there is a primary recipient and that the other recipients are copied.

For each user, there is a server SMTP or Mail Transfer Agent (MTA) which is responsible to issue the messages from a mailbox or to deliver the messages in a mailbox. Thus, for user 10, it is MTA 20 which receives the e-mails from user 10 and which is in charge of sending emails to the recipients. Assuming that MTA 22 is associated with the domain A including the addresses of user A1 14 and user A2 16, the e-mails are sent from MTA 20 to MTA 22 which delivers the messages in the mailbox of user 14 and the mailbox of user 16. Likewise, if it is another MTA 24 which is in charge of the address of user B 18, the e-mails are forwarded from MTA 20 to MTA 24 which delivers the message in the mailbox of user B 18.

It is assumed now that the sender 10 wants to cancel one of its previously-sent e-mails. The sender 10 issues a cancellation message containing the message to be canceled. According to the principles of the invention, the cancellation message is received by a cancel mailbox associated with MTA 20. This cancel mailbox of the sender is responsible to manage the process of cancellation via a flow of actions described in the following and using a cancel mailbox 28 associated with MTA 22 and a cancel mailbox 30 associated with MTA 24.

Figure 2:
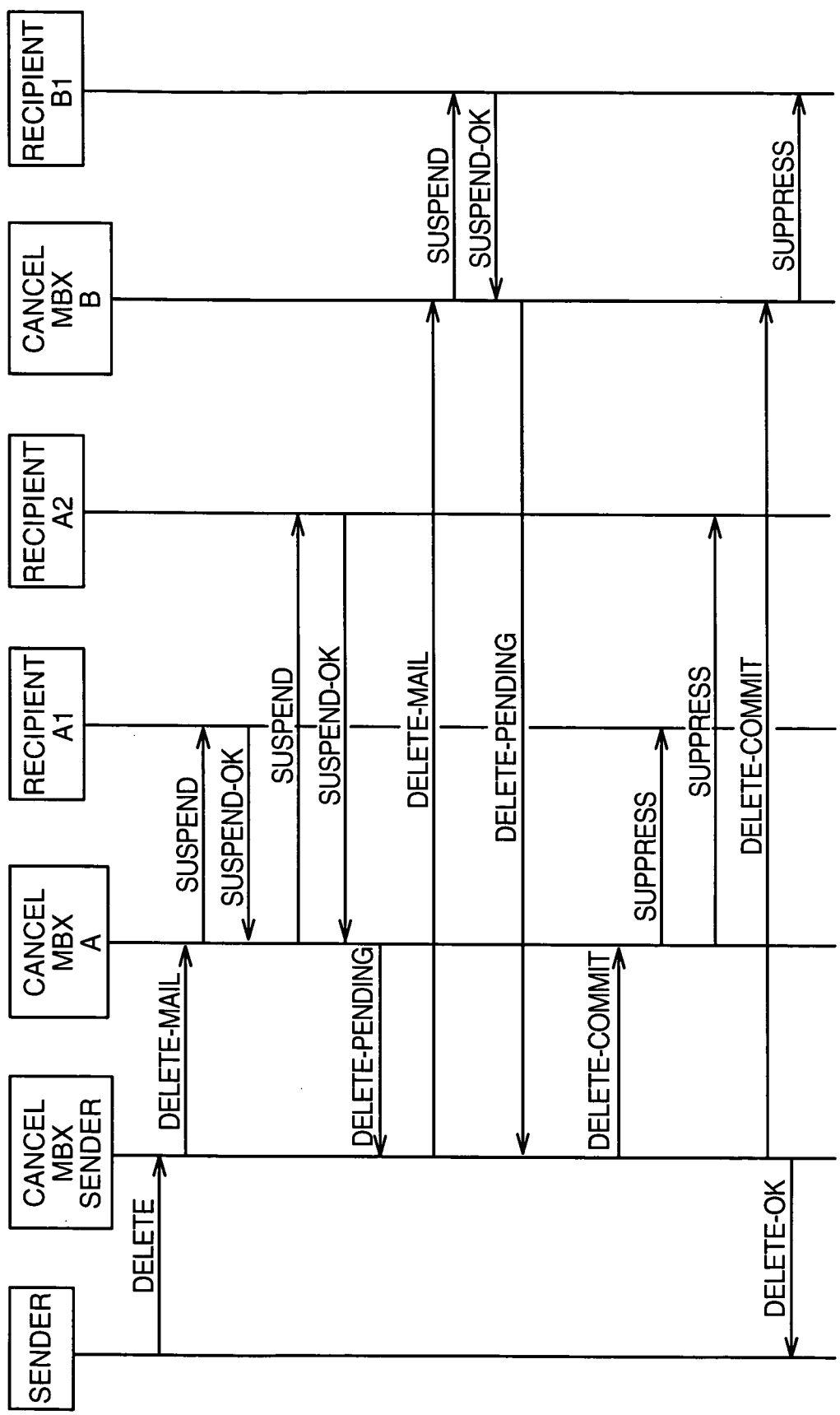
FIG. 2 is a time diagram of the messages which are exchanged for canceling a previously-sent e-mail in the system illustrated in FIG. 1 when the e-mail has not yet been read.

As illustrated in FIG. 2, the sender sends a cancellation message DELETE to the cancel mailbox of the sender. Upon receiving this message, the cancel mailbox of the sender forwards a message DELETE-MAIL to the cancel mailbox of MTA A and also to the cancel mailbox of MTA B. Upon receiving this message, the cancel mailbox A sends a message SUSPEND to the mailbox of each recipient A1 and A2. Likewise, upon receiving the message DELETE-MAIL, the cancel mailbox B sends a message SUSPEND to the mailbox of the recipient B.

Assuming that the e-mail previously sent by the sender has not been read by any one of the recipients, each mailbox sends back a message SUSPEND-OK to the associated cancel mailbox as illustrated in FIG. 2, meaning that the message which has not yet been read will not be supplied to the recipient.

Upon receiving the message SUSPEND-OK from the recipient mailbox, the cancel mailbox forwards immediately a message DELETE-PENDING to the cancel mailbox of the sender, meaning that the deletion of the initial e-mail is pending.

Assuming that the cancel mailbox of the sender receives a message DELETE-PENDING from all the cancel mailboxes, it knows that the e-mail has not been read by any one of the recipients and that it may be deleted. Accordingly, the cancel mailbox of the sender forwards a message DELETE-COMMIT to all the cancel mailboxes. Upon receiving the message, each cancel mailbox delivers a message SUPPRESS to the mailbox of the associated recipients, that is recipients A1 AND A2 for cancel mailbox A and recipient B for cancel mailbox B, meaning that the e-mail must be deleted. At the same time, the cancel mailbox of the sender sends an acknowledgment message DELETE-OK to the sender in order to keep the latter aware that the message has been deleted for all recipients.

Figure 3:
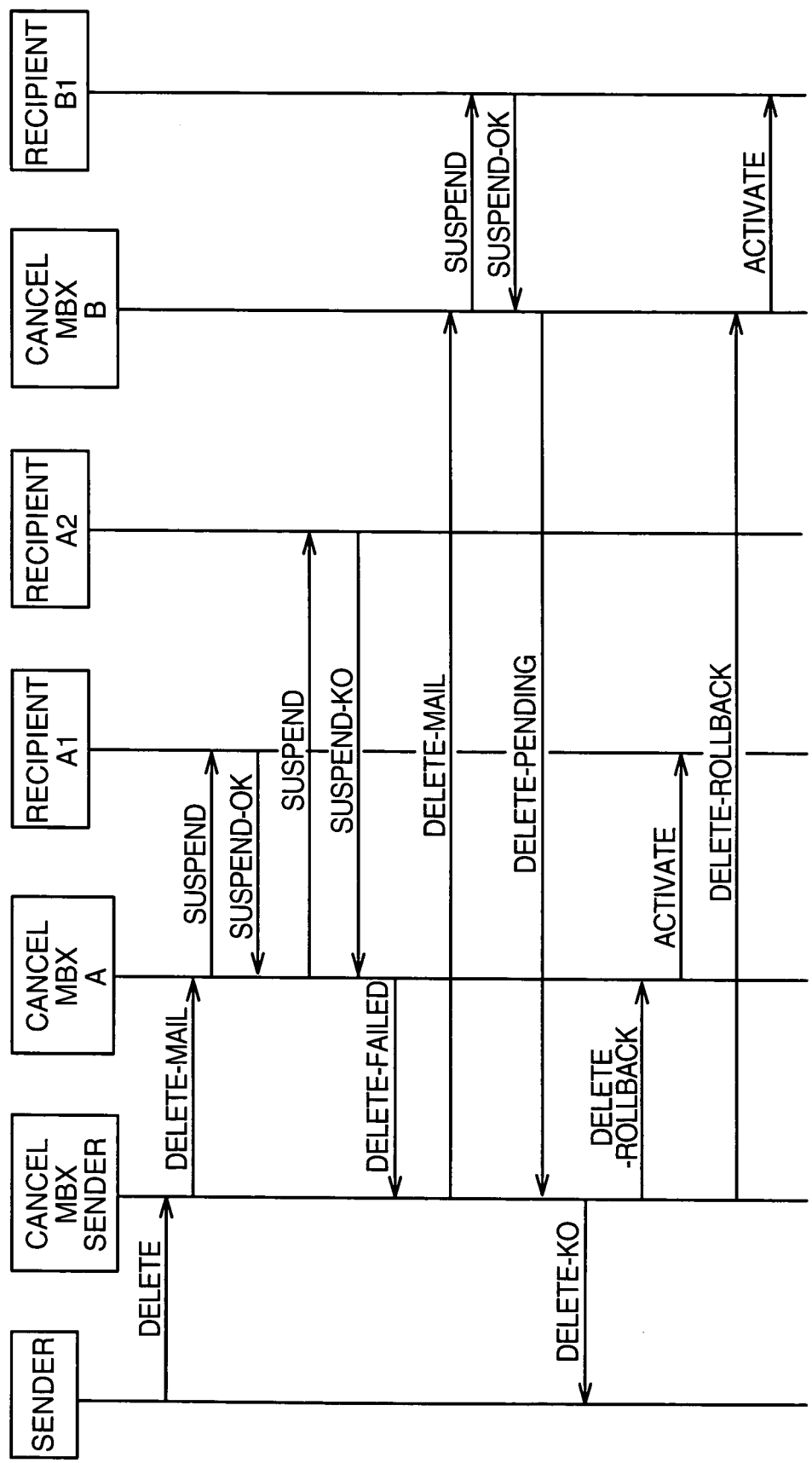
FIG. 3 is a time diagram of the messages which are exchanged for the cancellation of a previously-sent e-mail in the system illustrated in FIG. 1 when the e-mail has already been read by a recipient.

In a second situation illustrated in FIG. 3, the e-mail previously sent by the sender has already been read by one of the recipients. It is assumed that it is recipient A2 which has already read the previously-sent e-mail. In such a case, the mailbox of recipient A2 sends back a message SUSPEND-KO to the cancel mailbox A upon receiving the message SUSPEND from the cancel mailbox A meaning that it is not possible to suspend reading of the e-mail. Upon receiving the message, the cancel mailbox A sends a message DELETE-FAILED to the cancel mailbox of the sender. Accordingly, the cancel mailbox of the sender has received messages from all the cancel mailboxes associated to the recipients. However, at least one of these messages is a message DELETE-FAILED and not a message DELETE PENDING as for all the other cancel mailboxes. Then, the sender cancel mailbox sends back an acknowledgment message DELETE-KO to the sender mailbox meaning that the e-mail will not be deleted since at least one recipient has already read the e-mail. At the same time, the cancel mailbox of the sender forwards a message DELETE-ROLLBACK to all the cancel mailboxes associated with the recipients to inform them that they have to cancel the suspended deletion. Upon receiving the message DELETE-ROLLBACK, the cancel mailbox delivers a message ACTIVATE to the mailbox of each recipient who has not yet read the e-mail, such a message being useless for a recipient having read the e-mail.

Figure 4:
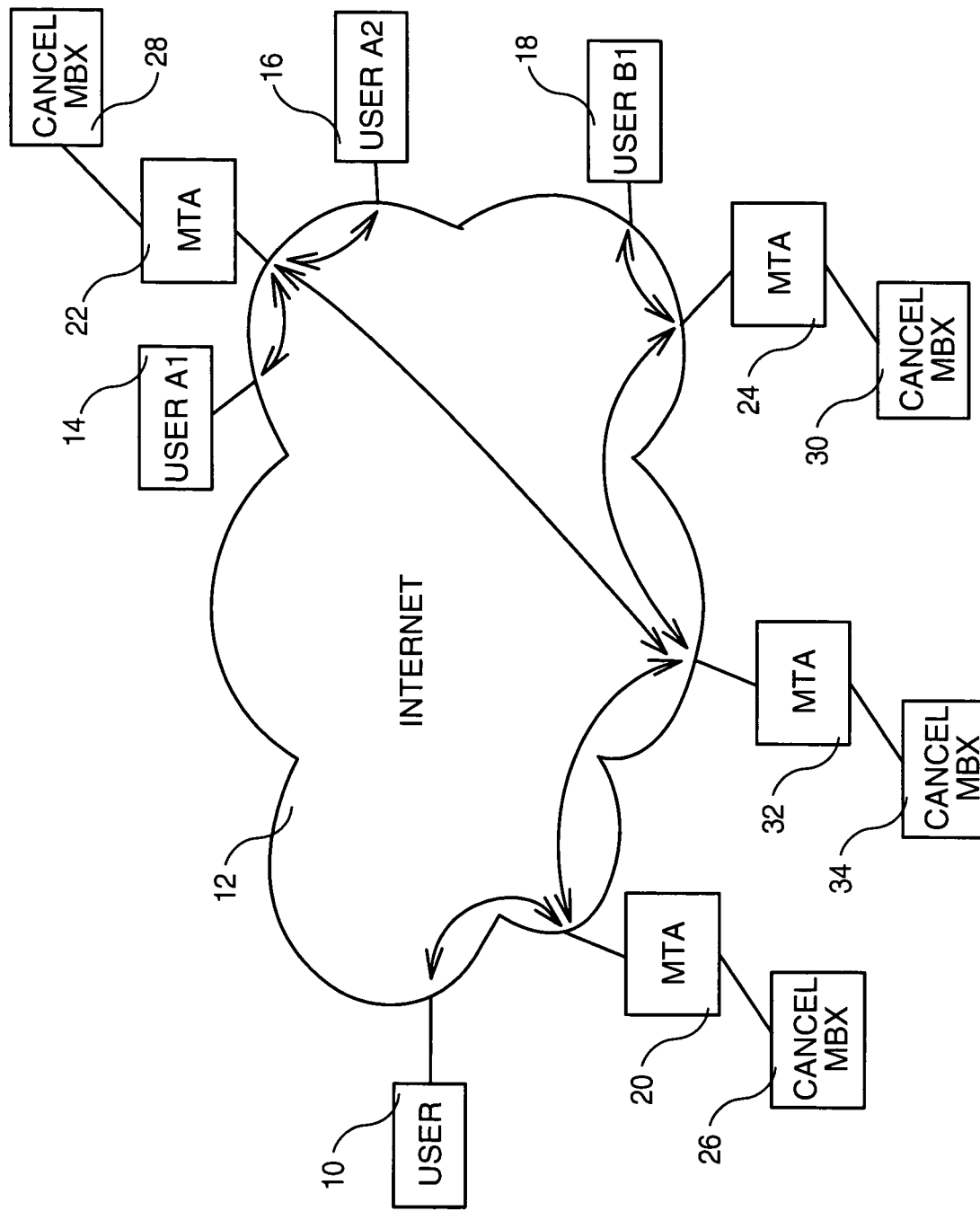
FIG. 4 is a second embodiment of a data transmission system enabling the cancellation of previously-sent e-mail message according to the invention.

In reference to FIG. 4, another case is when there is an intermediary MTA between the MTA associated with the sender and the MTAs associated with the recipients. Such an intermediary MTA exists when it is responsible for a specific domain name or for a distribution list. In such a case, the e-mail is first sent from MTA 20 associated with the sender 10 to the intermediary MTA 32. The intermediary MTA 32 is then in charge of forwarding the e-mail to each MTA associated with the recipients of the e-mail, that is MTA 22 for the recipients 14 and 16 and MTA 24 for the recipient 18. As for the other MTAs, the intermediary MTA 32 Includes a cancel mailbox 34 responsible for managing the process of cancellation. It must be noted that, in a more complex situation, it would be possible to have more than one intermediary MTA, all the intermediary MTAs constituting a hierarchy of MTAs associated with sub-domains included each in larger domain and so on.

Figure 5:
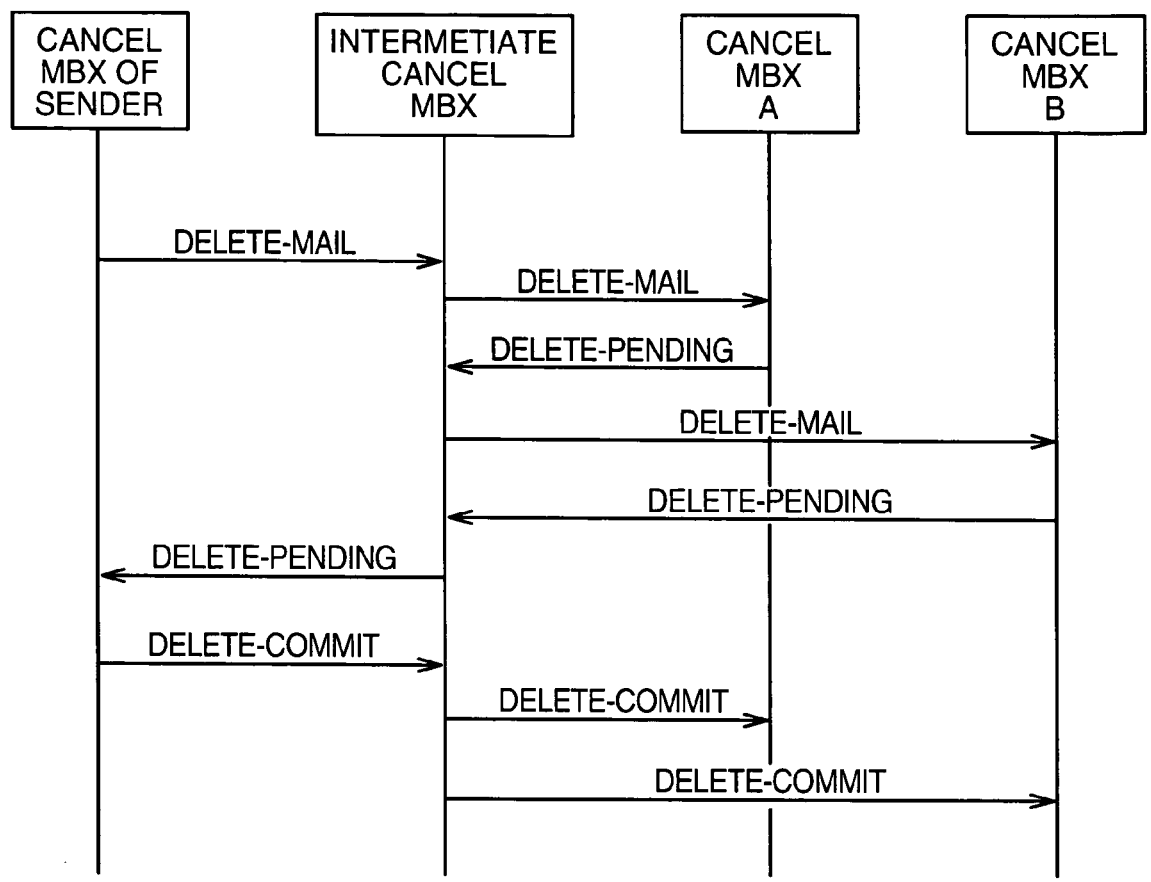
FIG. 5 is a time diagram of the messages which are exchanged between the cancel mailboxes for the cancellation of a previously-sent e-mail in the system illustrated in FIG. 4 when the e-mail has not yet been read.

As illustrated in FIG. 5, the cancel mailbox of the sender sends a message DELETE-MAIL to the cancel mailbox of the intermediate MTA. However, instead of delivering a message SUSPEND directly to the recipients as it was the case in reference to FIGS. 2 and 3, the intermediate cancel mailbox sends also a message DELETE-MAIL to cancel mailboxes A and B. The message DELETE-MAIL would be forwarded again to a subsequent intermediate cancel mailboxes if there were a hierarchy of MTAs. If the e-mail has not yet been read by any recipient, the cancel mailboxes associated with the recipients forward back a message DELETE-PENDING to the intermediate cancel mailbox which also returns a message DELETE-PENDING to the cancel mailbox of the sender. Upon receiving this message or several messages DELETE-PENDING if there are several intermediate MTAs, the cancel mailbox of the sender forwards a message DELETE-COMMIT to the intermediate cancel mailbox(es), such a message being forwarded again by all the intermediate mailboxes of the hierarchy to the cancel mailboxes responsible to deliver a message SUPPRESS to the mailboxes of the recipients. The remaining steps of this process are identical to the steps described previously in reference to FIG. 2.

Figure 6:
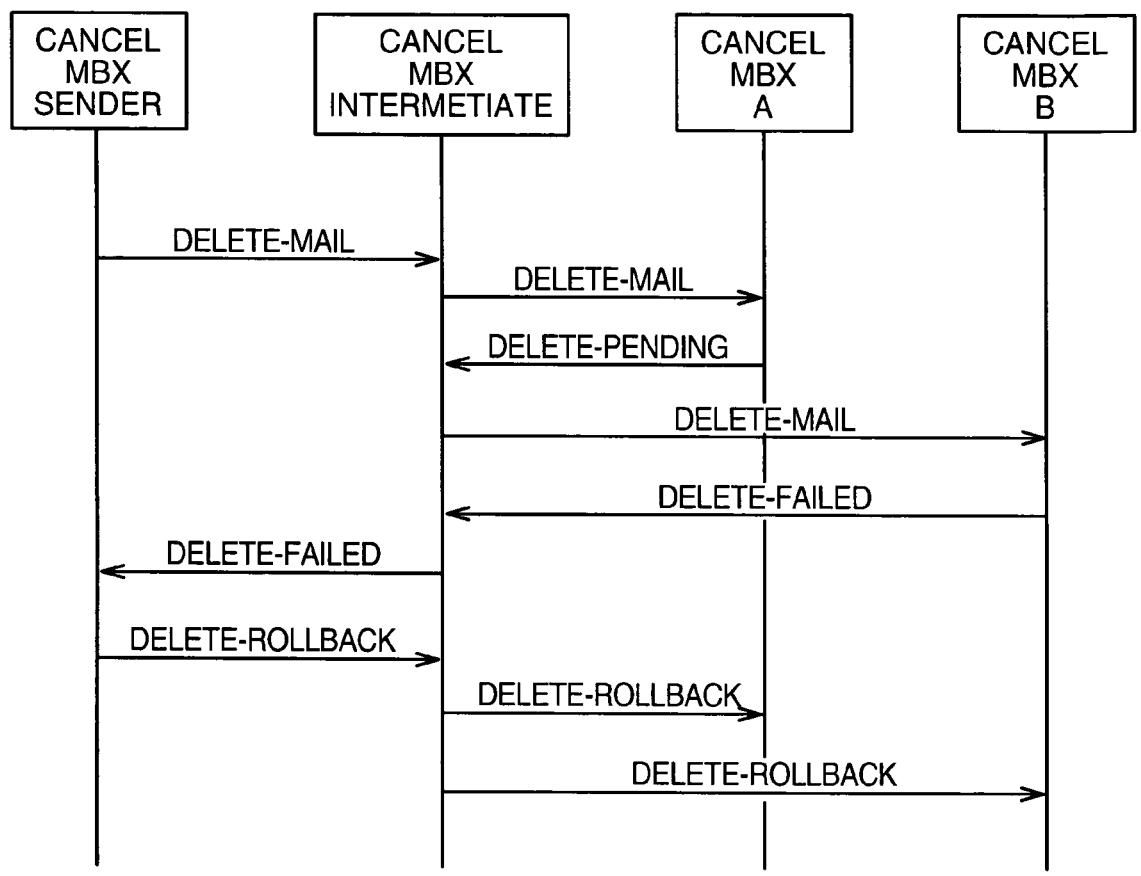
FIG. 6 is a time diagram of the messages which are exchanged between the cancel mailboxes for the cancellation of a previously-sent e-mail in the system illustrated in FIG. 4 when the e-mail has already been read by a recipient.

Assuming that one of the recipients has already read the e-mail, the message which is returned by the cancel mailbox as illustrated in FIG. 6 is not DELETE-PENDING but DELETE FAILED as already explained in reference to FIG. 3. The same message is transferred from the intermediate cancel mailbox to the cancel mailbox of the sender. As detailed previously, a message DELETE-ROLLBACK is sent from the cancel mailbox of the sender to the intermediate cancel mailbox (and to all the intermediate cancel mailboxes, if any), and finally to the cancel mailbox B responsible for activating the e-mail in the mailboxes of the other recipients, since the e-mail will not be deleted inasmuch as one of the recipients has already read it.

It must be noted that an intermediate MTA repeats, in both directions, any message received from the cancel mailbox of a MTA toward another MTA such as the deliver MTA in one direction or such as the sender MTA in the other direction.

A cancellation agent is associated with each cancel mailbox. A cancellation agent is a program in charge of reading the messages from the user mailboxes located in the associated domain to check whether a message is not yet read. The actions of the cancellation agent in the mailbox are the following:

"Identifying an unread e-mail" in response to the message DELETE-MAIL,
"Mask an unread e-mail" before sending the message DELETE-PENDING,
"Unmask an unread message" after receiving the message DELETE-ROLLBACK",
"Delete an e-mail" after receiving the message DELETE-COMMIT.

Figure 7:
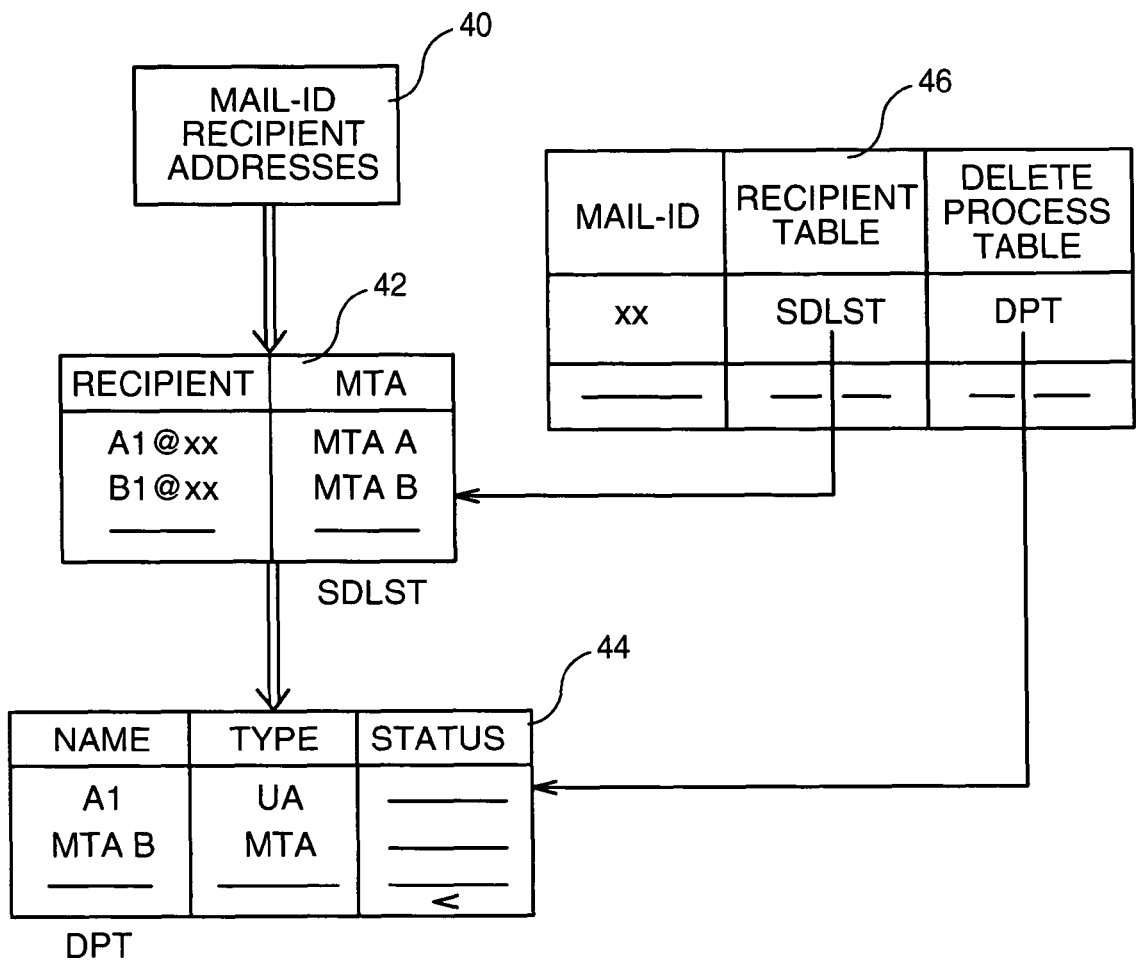
FIG. 7 is a schematic representation of the tables being used in a MTA device for the implementation of the method according to the invention.

When a message 40 issued either by a user agent (UA) in case of DELETE or by a mail transfer agent (MTA) in case of DELETE-MAIL, is received by a MTA, the cancellation agent of the MTA builds a set of tables as illustrated in FIG. 7. First, it parses the recipient addresses received with the e-mail in order to build a Recipient table 42. Such a table includes for each addressed recipient the MTA with which the recipient is associated. If the address corresponds to a distribution list, this distribution list is expanded. If an alias is found, the alias is replaced by the address of the aliased user.

Then, the Recipient table (corresponding to SDLST in FIG. 7) is scanned to build a Delete Process Table 44 for each e-mail to be deleted wherein each entry corresponds to the name of the recipient. For each entry, two fields are defined in the table, the type that is UA (for User agent) or MTA, and the status corresponding to the entry. As described in the following, this field is modified according to which kind of message is received by the UA or the MTA.

Finally, both the Delete Process table 44 and the Recipient table 42 are mapped in a Mail Delete table 46 which is unique for each MTA. Assuming that, for an e-mail identified by XX, a Recipient table SDLST and a Delete Process table DPT have been built, the Mail Delete table 46 will include for the entry XX, SDLST pointing to the identified Recipient table and DPT pointing to the identified Delete Process table.

It must be noted that some MTAs can use aliases to mask their current mail infrastructure. Thus, an e-mail could be sent to john@ibm.com whereas the final address after converting the alias address is in fact john@lagaude33.ibm.com. In some cases, a domain name is managed by a MTA forwarding incoming messages for the domain. In all these cases, the problem is solved by the intermediate cancel mailbox responsible of the domain wherein the cancellation agent has access to the Domain Name Server (DNS).

Figure 8:
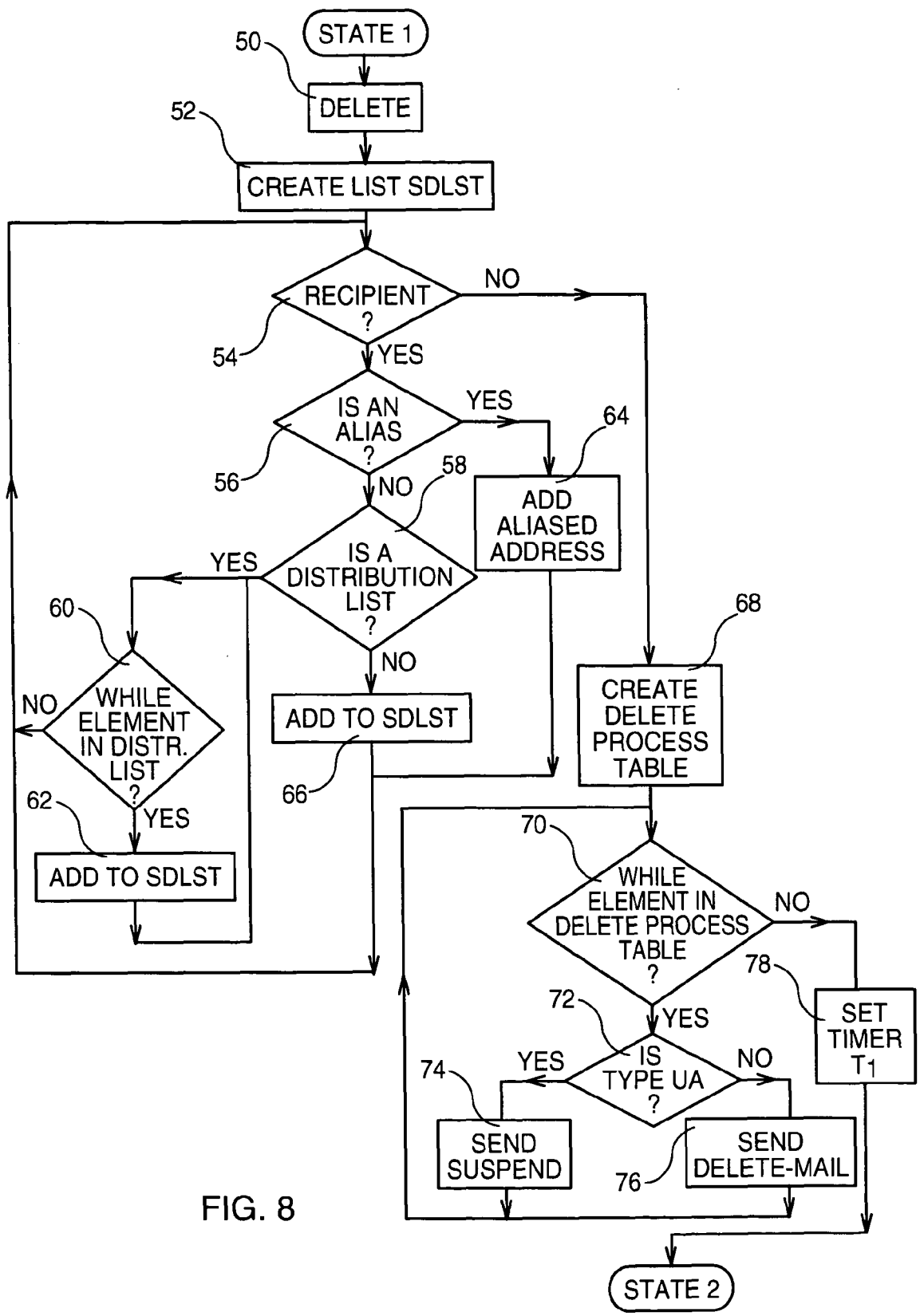
FIG. 8 is a flowchart of the steps which are achieved for building the MTA tables illustrated in FIG. 7.

The process achieved in cancel mailbox for canceling an e-mail received by the MTA depends on whether this MTA is the sender MTA, an intermediate MTA or the deliver MTA. For all MTAs, there is a first state, STATE 1, as illustrated in FIG. 8. At the beginning, the cancel mailbox of the MTA receives a message DELETE or DELETE-MAIL (step 50). As described in reference to FIG. 7, the cancellation agent creates a recipient table SDLST (step 52). As there can be several recipients, a loop of steps is achieved. At the beginning, it is determined whether there is still a recipient to process (step 54). If so, it is determined whether the recipient name is an alias (step 56). If it is not the case, it is determined whether the received address corresponds to a distribution list (step 58). If so, it is determined whether there is another element to process in the distribution list (step 60) and if so, this element is added in the table SDLST (step 62) before checking again whether there is any more element in the distribution list.

When the recipient name is an alias, the aliased address is added in the table (step 64) and when the address does not correspond to a distribution list, the address is added in the table SDLST (step 66). In both cases and after all the elements of a distribution list have been added in the table, the process is looped back to the beginning for determining whether there is another recipient (step 54).

If there are no more recipients in the address list of the e-mail, the delete process table is created by the cancellation agent as described above (step 68). Such a creation being a loop of steps as long as there is still an element to be put in the table, it is first determined whether there is a new element for the delete process table (step 70). If it is the case, the process is different according to whether the MTA associated with the recipient address is a User agent (UA) or not (step 72). If it is an UA, this means that the recipient is under the control of this UA and a message SUSPEND is sent from the cancel mailbox of the UA to the mailbox of the recipient (step 74). If it is not the case, the cancel mailbox sends a message DELETE-MAIL to the MTA associated with the recipient (step 76). After the transmission of the message SUSPEND or DELETE-MAIL, the process is looped back to the determination of a new element for the delete process table (step 70).

Note that, if there is no new element to be processed in the delete process table, a timer T1 is set (step 78) and the process goes to STATE 2.

Figure 9:
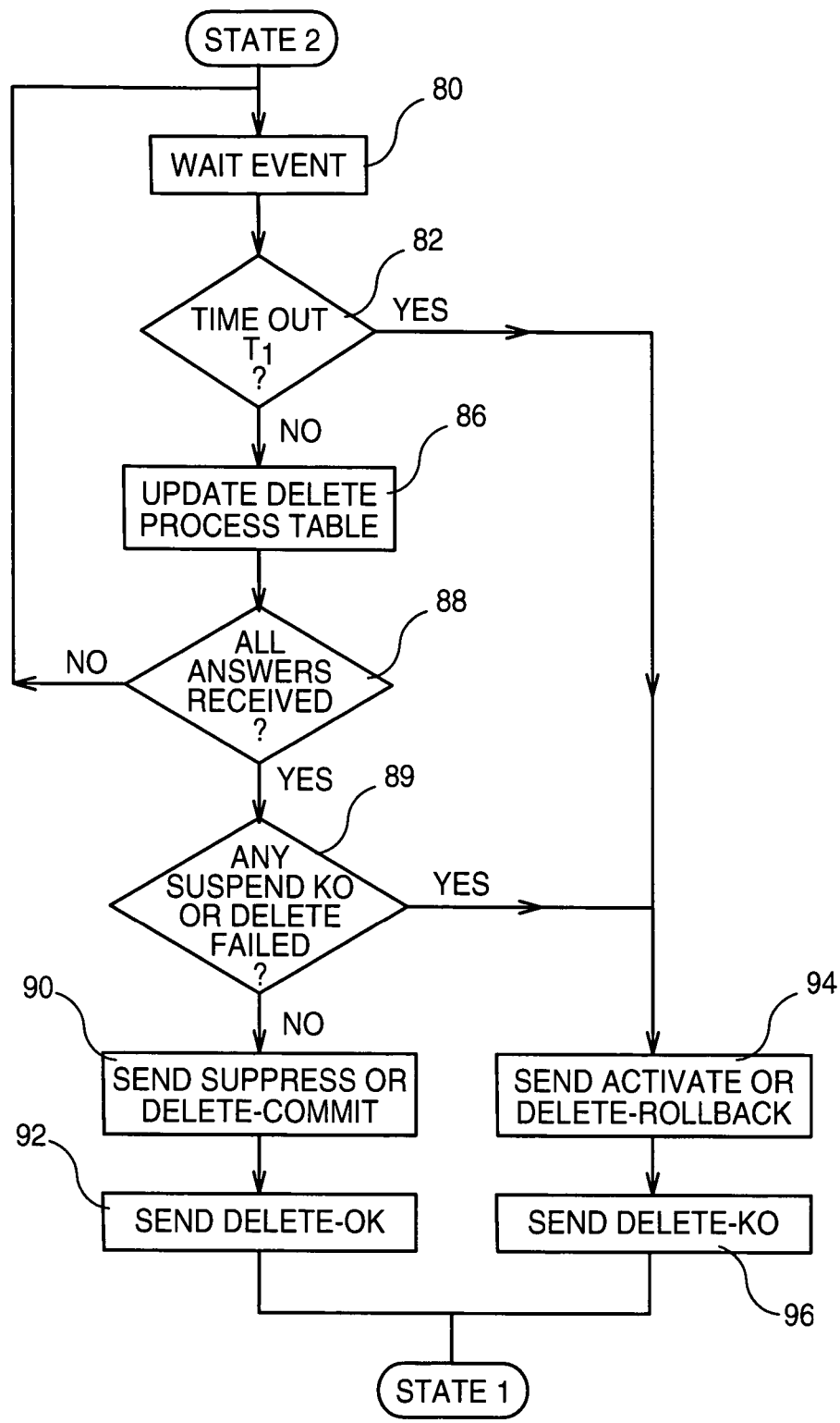
FIG. 9 is a flowchart of the steps which are achieved in a sender MTA upon receiving a cancellation e-mail.

STATE 2 is different according to whether the MTA is the sender MTA or another MTA such as an intermediate MTA or the deliver MTA. If it is the sender MTA, the process achieved in STATE 2 is illustrated by the flow chart of FIG. 9. At the beginning, the process is waiting for an event (step 80). When such an event is detected, it is determined whether it corresponds to the time out of Time 1 (step 82). If it is not the case, it is determined whether the event corresponds to a message SUSPEND OK sent directly from the recipient mailbox or a message DELETE-PENDING sent from a MTA (step 84). If it is the case, the delete process table is updated by writing the message in the status field of the entry corresponding to the recipient address (step 86). After that, it is determined whether the answers corresponding to all the recipients have been received (step 88). If not, the process is looped back to the step of waiting for an event (step 80).

When all answers from the recipient mailboxes have been received, the cancellation agent forwards a message SUPPRESS to the recipient mailbox or a message DELETE-COMMIT to the MTA (step 90) and at the same time sends a message DELETE-OK to the sender (step 92). However, when the event being received is the time out from timer T1 or the message is not SUSPEND-OK or DELETE-PENDING, this means that the e-mail has already been read, the received message being SUSPEND-KO or DELETE-FAILED. In such a case, the cancel mailbox forwards a message ACTIVATE to the recipient mailbox or a message DELETE-ROLLBACK to the MTA (step 94). At the same time, it sends a message DELETE-KO to the sender to inform it that the e-mail will not be deleted because one of the recipients has already read the e-mail. In all cases, after sending the message, the process leaves STATE 2 for coming back to STATE 1.

Figure 10:
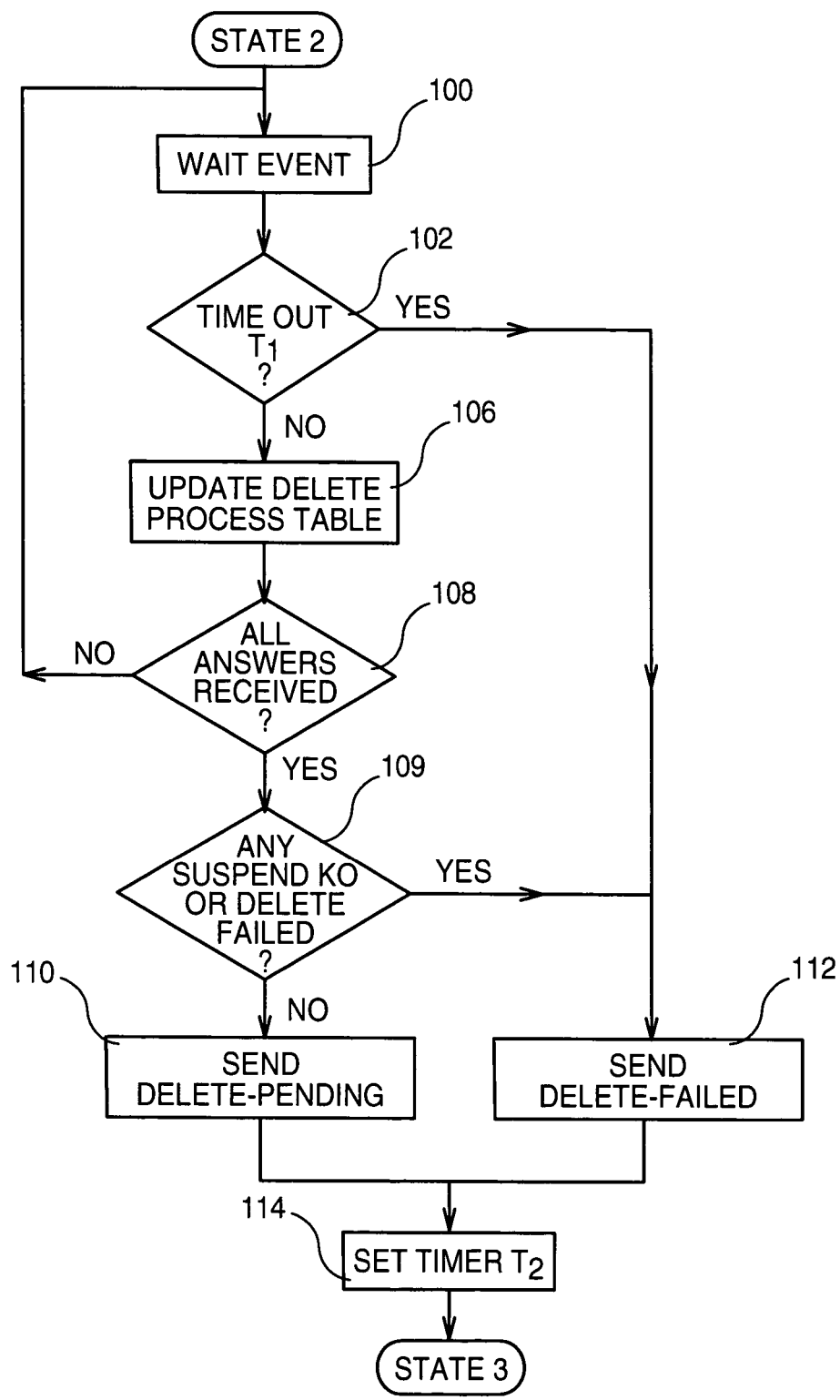
FIG. 10 is a flowchart of the steps which are achieved in an intermediate or deliver MTA upon receiving a cancellation message.

FIG. 10 illustrates STATE 2 when the MTA is an intermediate MTA or deliver MTA. At the beginning, the process is waiting for an event (step 100). When such an event is detected, it is determined whether it corresponds to the time out of timer T1 (step 102). If it is not the case, it is determined whether the event corresponds to a message SUSPEND OK sent directly from the recipient mailbox or a message DELETE-PENDING sent from a MTA (step 104). If it is the case, the delete process table is updated by writing the message in the status field of the entry corresponding to the recipient address (step 106). After that, it is determined whether the answers corresponding to all the recipients have been received (step 108). If not, the process is looped back to the step of waiting for an event (step 100).

When all answers from the recipient have been received, the MTA forwards a message DELETE-PENDING to the preceding intermediate MTA or the sender MTA (step 110). However, when the event received is the time out of Timer T1 or the message is not SUSPEND-OK or DELETE-PENDING, this means that the e-mail has already been read, the message being SUSPEND-KO or DELETE-FAILED. In such a case, the cancel mailbox forwards a message DELETE-FAILED to the preceding intermediate MTA or the sender MTA (step 112) and a Timer T2 is set (step 114). In all cases, after sending the message, the process leaves STATE 2 for inputting a STATE 3.

Figure 11:
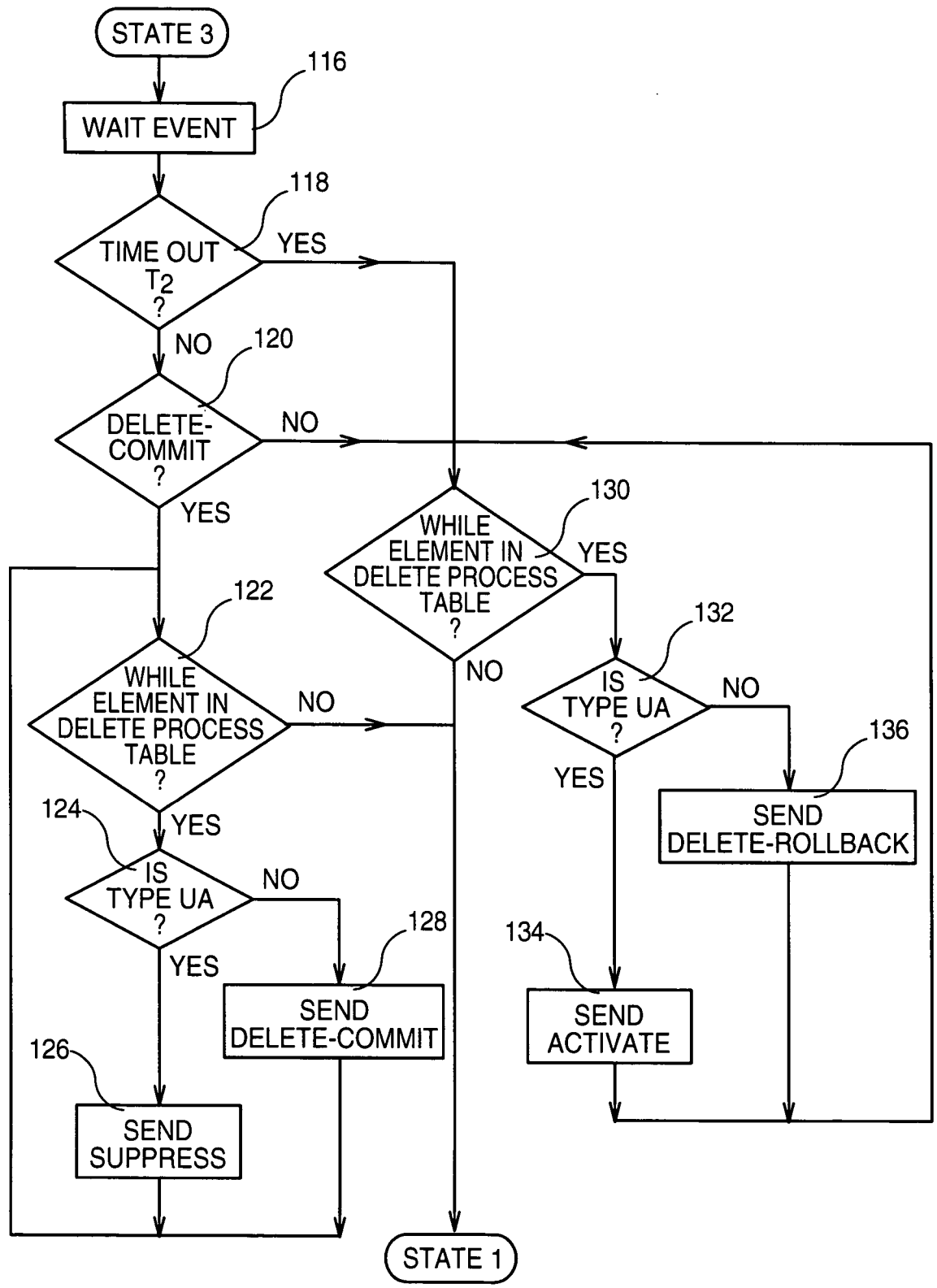
FIG. 11 is a flowchart of the steps which are achieved in any MTA for performing the method of cancellation of an e-mail according to the invention.

STATE 3 illustrated in FIG. 11 starts with a step of waiting for an event (step 116). It is first determined whether the event is the time out of timer T2. If it is not the case, it is determined whether the message which has been received is DELETE-COMMIT (step 120) meaning that the e-mail has not been read by any one of the recipients. If so, it is necessary to know the recipients who are addressed in the e-mail. Therefore, a loop is started by determining whether there is still an element to be checked in the delete process table (step 122). If it is the case, it is determined whether this element (a recipient name) corresponds to a user agent (step 124). If so, this means that the MTA is a deliver MTA and it has to send a message SUPPRESS to the recipient mailbox in order to delete the e-mail (step 126). If it is not an UA, it is an intermediate MTA and the cancellation agent of the MTA has to send a message DELETE-COMMIT to the following MTA which can be an intermediate MTA or the deliver MTA (step 128). After sending a message SUPPRESS or DELETE-COMMIT, the process is looped back to the step of checking the next element in the delete process table (step 122).

When the event is the time out of timer T2 or is not a message DELETE-COMMIT, this means that the e-mail has already been read by at least one of the recipients. It is therefore necessary to know the recipients in order to inform them that the e-mail will not be deleted. As detailed previously, a loop is started by determining whether there is an element to be checked in the delete process table (step 130). If it is the case, it is determined whether the element (a recipient name) corresponds to a user agent (step 132). If so, this means that the MTA is a deliver MTA and it has to send a message ACTIVATE to the recipient mailbox meaning that the e-mail may be read by the recipient (step 134). If it is not an UA, it is an intermediate MTA and the cancellation agent of the MTA sends a message DELETE-ROLLBACK to the following MTA which can be an intermediate MTA or the deliver MTA (step 136). After sending a message ACTIVATE or DELETE-ROLLBACK, the process is looped back to the step of checking the next element in the delete process table (step 130). Note that, if there are no more elements to be checked in the delete process table either when the event is the time out of timer T2 or in any case upon reception of a message, STATE 3 is completed and the process goes again to STATE 1.

The invention claimed is:

1. System for enabling the cancellation of a previously-sent e-mail, comprising:
   a data transmission network, wherein a plurality of users are connected to said network, each of said users being able as a sender to send an e-mail over said network to a plurality of users as recipients connected to said network, and wherein a message transfer agent (MTA) is associated with each of said users for sending the e-mail when said user acts as a sender and delivering the e-mail when said user acts as a recipient,
   wherein each MTA includes a cancel mailbox for transmitting a cancellation message to said recipients when the user associated with said MTA is a sender wanting to cancel a previously-sent e-mail and for managing the cancellation of e-mails in the mailbox of the user associated with said MTA upon receiving said cancellation message from said sender when this user is a recipient,
   wherein the cancel mailbox of each MTA cancels the e-mail sent to the recipients only when none of the recipients has read the e-mail, and does not delete the e-mail when any of said recipients has read said e-mail,
   wherein the cancel mailbox in each said MTA is associated with a cancellation agent for managing the cancellation of the e-mail,
   wherein the cancellation agent reads messages from the recipients and in response to a content of the messages identifies an unread email, masks the unread email, unmasks an unread message, and deletes the email, wherein the managing the cancellation of the e-mail includes building a recipient table for the cancellation message in response to the cancellation message being sent and building a delete process table for the cancellation message in response to a message status response from each recipient, an intermediate MTA, different than the MTA associated with the sender and the MTA associated with any of the recipients, and responsible for a specific domain name or for a distribution list, between the MTA associated with the sender and the MTA associated with any of the recipients, the intermediate MTA including a cancel mailbox different than the cancel mailbox of the MTA associated with the sender and the cancel mailbox of the MTA associated with any of the recipients, the cancel mailbox of the intermediate MTA receiving the cancellation message from the MTA associated with the sender and, in response, transmitting the cancellation message to the MTA associated with each recipient.

2. Process for canceling a previously-sent e-mail in a system comprising a data transmission network, wherein a plurality of users are connected to said network, each of said users being able as a sender to forward an e-mail over said network to a plurality of users as recipients connected to said network, and wherein a message transfer agent (MTA) is associated with each of said users for sending the e-mail when said user acts as a sender and delivering the e-mail when said user acts as a recipient;

said process comprising:
a) sending from said sender a message for deleting said e-mail to a cancel mailbox included in said sender MTA,
b) sending from said cancel mailbox included in the sender MTA a message to a cancel mailbox included in each MTA respectively associated with the recipients being addressed in said e-mail in order to inform the recipients that said e-mail has to be deleted if it is not yet read,
wherein the cancel mailbox in each said MTA is associated with a cancellation agent for managing the cancellation of the e-mail,
wherein the cancellation agent reads messages from the recipients and in response to a content of the messages identifies an unread email, masks the unread email, unmasks an unread message, and deletes the email,
wherein the managing the cancellation of the e-mail includes building a recipient table for the cancellation message in response to the cancellation message being sent and building a delete process table for the cancellation message in response to a message status response from each recipient,
c) sending from said cancel mailboxes of said MTAs respectively associated with said recipients a message requesting that said e-mail has to be masked only if it has not yet been read, and
d) deleting said masked e-mail only when none of said recipients has read said e-mail, and not deleting the masked e-mail when any of said recipients has read said e-mail;
wherein there is an intermediate MTA, different than the MTA associated with the sender and the MTA associated with any of the recipients, and responsible for a specific domain name or for a distribution list, between the MTA associated with the sender and the MTA associated with any of the recipients, the intermediate MTA including a cancel mailbox different than the cancel mailbox of the MTA associated with the sender and the cancel mailbox of the MTA associated with any of the recipients, wherein step b) further includes receiving, at the cancel mailbox of the intermediate MTA, the cancellation message from the MTA associated with the sender and, in response, transmitting the cancellation message to the MTA associated with each recipient.

3. Process according to claim 2, wherein a cancel mailbox of a MTA associated with each recipient sends back via the intermediate MTA an acknowledgement message of a first type if said recipient has not yet read said e-mail.

4. Process according to claim 3, wherein the cancel mailbox of the MTA associated with several recipients sends back via the intermediate MTA a first type message to said sender MTA if none of these recipients has already read said e-mail.

5. Process according to claim 4, wherein said step d) comprises sending from the cancel mailbox of said sender MTA a message via the intermediate MTA to the cancel mailboxes of the MTAs associated with all the recipients addressed in said e-mail requesting each cancel mailbox to delete said e-mail.

6. Process according to claim 5, wherein said step d) further comprises the step of sending a message from said cancel mailboxes of the MTAs associated with all recipients to the recipient mailboxes in order to delete said e-mail.

7. Process according to claim 5, wherein the cancel mailbox of said sender MTA sends a first type acknowledgment message to the mailbox of said sender to confirm that said e-mail has been deleted.

8. Process according to claim 2, wherein a cancel mailbox of a MTA associated with a recipient sends back via the intermediate MTA an acknowledgment message of a second type if said recipient has already read said e-mail.

9. Process according to claim 8, wherein the cancel mailbox of the MTA associated with several recipients sends back via the intermediate MTA a second type message to said sender MTA if at least one of these recipients has already read said e-mail.

10. Process according to claim 9, wherein said step d) comprises sending from the cancel mailbox of said sender MTA a message via the intermediate MTA to the cancel mailboxes of the MTAs associated with the recipients who have not yet read said e-mail requesting not to delete said e-mail.

11. Process according to claim 10, wherein said step d) further comprises the step of sending a message from said cancel mailboxes of the MTAs associated with the recipients who have not yet read said e-mail to the mailboxes of said recipients in order not to delete said e-mail.

12. Process according to claim 10, wherein the cancel mailbox of said sender MTA sends a second type acknowledgment message to the mailbox of said sender to confirm that said e-mail has not been deleted.

13. Process according to claim 2, wherein at least one of said recipients is addressed by an alias, the cancel mailbox of the MTA receiving said alias being adapted to send a request to an associated domain name server (DNS) in order to obtain the address corresponding to said alias.

14. The system of claim 1, wherein the recipient table includes for each recipient a recipient address and an identification of an associated MTA.

15. The system of claim 1, wherein the delete process table for each recipient includes a recipient name and a status of said e-mail during the cancellation process managed by said cancellation agent.

16. The system of claim 1, wherein the managing the cancellation of the e-mail further includes building a mail delete table from the recipient table and the delete process table.

* * * * *